United States Patent
Higashino et al.

(10) Patent No.: US 12,101,044 B2
(45) Date of Patent: Sep. 24, 2024

(54) LINEAR MOTOR SYSTEM

(71) Applicant: Mitsubishi Electric Corporation, Tokyo (JP)

(72) Inventors: Makoto Higashino, Tokyo (JP); Satoshi Odaira, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 117 days.

(21) Appl. No.: 17/920,030

(22) PCT Filed: May 13, 2020

(86) PCT No.: PCT/JP2020/019119
§ 371 (c)(1),
(2) Date: Oct. 20, 2022

(87) PCT Pub. No.: WO2021/229723
PCT Pub. Date: Nov. 18, 2021

(65) Prior Publication Data
US 2023/0208334 A1 Jun. 29, 2023

(51) Int. Cl.
*H02P 25/064* (2016.01)
*H02P 23/14* (2006.01)

(52) U.S. Cl.
CPC .......... *H02P 25/064* (2016.02); *H02P 23/14* (2013.01)

(58) Field of Classification Search
USPC ....................................................... 318/135
See application file for complete search history.

(56) References Cited

U.S. PATENT DOCUMENTS

| | | | | |
|---|---|---|---|---|
| 2008/0007198 A1* | 1/2008 | Kinpara | ................. | H02P 21/14 318/807 |
| 2012/0091928 A1* | 4/2012 | Markon | ............... | H02K 11/225 318/135 |
| 2015/0035458 A1* | 2/2015 | Takase | .................... | H02P 25/06 318/135 |

(Continued)

FOREIGN PATENT DOCUMENTS

JP 2015-33240 A 2/2015

OTHER PUBLICATIONS

International Search Report and Written Opinion mailed on Aug. 4, 2020, received for PCT Application PCT/JP2020/019119, filed on May 13, 2020, 9 pages including English Translation.

*Primary Examiner* — Gabriel Agared
(74) *Attorney, Agent, or Firm* — XSENSUS LLP

(57) ABSTRACT

The control device in a linear motor system calculates a current command value for the stator based on a first speed integrated value obtained by integrating a speed deviation between a speed command for the mover and an actual speed of the mover, and performs first digital filter computation on the current command value. The control device calculates a current command value for the stator based on a second speed integrated value obtained by integrating a speed deviation between a speed command for the mover and the mover's actual speed, and performs second digital filter computation on the current command value. The current command calculating unit calculates a second speed integrated value based on the first speed integrated value used by the control device, and performs the second digital filter computation using a value of the first digital filter computation of the control device.

13 Claims, 5 Drawing Sheets

(56) References Cited

U.S. PATENT DOCUMENTS

| | | | |
|---|---|---|---|
| 2016/0141994 A1* | 5/2016 | Takase | H02P 21/22 |
| | | | 318/135 |
| 2017/0163140 A1* | 6/2017 | Lu | H02K 41/031 |
| 2020/0195119 A1* | 6/2020 | Suzuki | H02P 25/066 |
| 2020/0333762 A1* | 10/2020 | Hirose | G05B 19/404 |

* cited by examiner

LINEAR MOTOR SYSTEM

CROSS-REFERENCE TO RELATED APPLICATION

The present application is based on PCT filing PCT/JP2020/019119, filed May 13, 2020, the entire contents which is incorporated herein by reference.

FIELD

The present disclosure relates to a linear motor system using a plurality of stators and a mover disposed with facing the stators.

BACKGROUND

There has been a linear motor system that includes stators having a plurality of armature winding units, a mover having a permanent magnet disposed with facing the stators, and a control device configured to perform electric conduction control on the stators. In this linear motor system, the control device sequentially switches the electric conduction to the stators depending on the position of the mover thereby to produce a thrust force. In this linear motor system, in order to reduce a switching shock that is an impact caused by a change in speed of the mover when the electric conduction to the stator is switched, it is desirable that electric current values applied to stators adjacent to each other have continuity.

A control device of a linear motor system described in Patent Literature 1 has an electric conduction switching compensation function for performing compensation for switching of electric conduction control on an armature winding unit to which the electric conduction is switched next. This electric conduction switching compensation function is a function of transferring, between control devices, a speed integrated value obtained by adding up difference values between speed command values and current speeds. The control devices of the linear motor system described in Patent Literature 1 control electric conduction target with use of the received speed integrated value, so as to reduce switching shocks.

CITATION LIST

Patent Literature

Patent Literature 1: Japanese Patent Application Laid-open No. 2015-33240

SUMMARY

Technical Problem

The technique of Patent Literature 1 described above is, however, problematic in that, because data transferred between the control devices in the electric conduction switching compensation function is limited by the speed integrated value, switching shocks are not sufficiently reduced.

The present disclosure has been made in view of the above circumstances, and an object thereof is to provide a linear motor system capable of sufficiently reducing switching shocks caused when electric conduction to the stators is switched.

Solution to Problem

To solve the aforementioned problems and achieve the object, the present disclosure provides a linear motor system comprising: a first stator; a second stator; a mover disposed to face the first stator and the second stator; a first control device to drive the mover by performing electric conduction to the first stator on the basis of a first speed command or a first position command for the mover when the mover faces the first stator; a second control device to drive the mover by performing electric conduction to the second stator on the basis of a second speed command or a second position command for the mover when the mover faces the second stator; and a command generating unit to transmit the first speed command or the first position command to the first control device and transmit the second speed command or the second position command to the second control device when the mover moves from the first stator to the second stator, thereby to sequentially cause the first control device to perform electric conduction to the first stator and the second control device to perform electric conduction to the second stator, wherein the first control device includes: a first current command calculating unit to calculate a first current command value for the first stator on the basis of a first speed integrated value obtained by integrating a speed deviation between the first speed command and a current speed that is an actual speed of the mover; and a first digital filter to perform first digital filter computation on the first current command value, the second control device includes: a second current command calculating unit to calculate a second current command value for the second stator on the basis of a second speed integrated value obtained by integrating a speed deviation between the second speed command and a current speed that is an actual speed of the mover; a second digital filter to perform second digital filter computation on the second current command value; and a control amount acquiring unit to acquire, from the first control device, a first speed integrated value used by the first current command calculating unit and an internal value of the first digital filter when the first digital filter has performed the first digital filter computation, the second current command calculating unit calculates the second speed integrated value on the basis of the first speed integrated value, and the second digital filter performs the second digital filter computation with use of the internal value.

Advantageous Effects of Invention

A linear motor system according to the present disclosure produces an advantageous effect that it can make sufficient reduction in switching shocks caused when electric conduction to stators is switched.

DESCRIPTION OF EMBODIMENTS

A linear motor system according to an embodiment of the present disclosure will be described in detail below with reference to the drawings.

Embodiment

Figure 1:
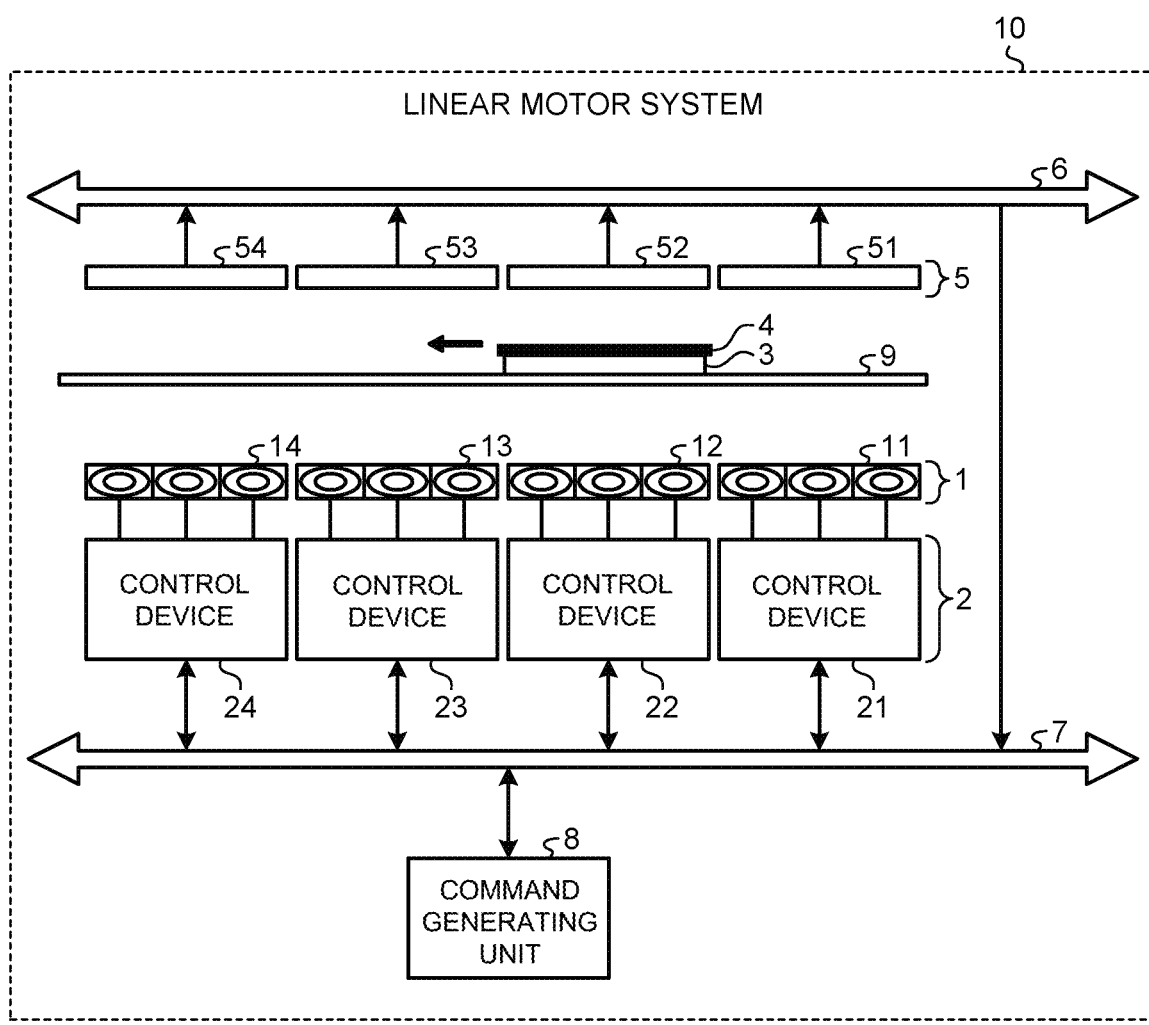
FIG. 1 is a diagram illustrating a configuration of a linear motor system according to an embodiment.

FIG. 1 is a diagram illustrating a configuration of a linear motor system according to the embodiment. The linear motor system 10 includes a stator group 1, a control device group 2, a mover 3, an encoder head 4, a reader group 5, a position information communication line 6, a control information communication line 7, a command generating unit 8, and a guide 9, which are configured to implement a servomechanism.

The stator group 1 includes a plurality of stators 11 to 14. The stators 11 to 14 each include an armature winding unit that is a set of windings. Note that the number of stators included in the stator group 1 may be five or more, or may be three or two. The stators 11 to 14 generate thrust depending on electric conduction by the control device group 2.

The control device group 2 includes a plurality of control devices 21 to 24. The control device 21 controls the stator 11, the control device 22 controls the stator 12, the control device 23 controls the stator 13, and the control device 24 controls the stator 14. As seen from the above, the control device group 2 includes the same number of control devices 21 to 24 as the number of stators 11 to 14 included in the stator group 1.

The control devices 21 to 24 are connected with armature winding units included in the stators 11 to 14, respectively, and perform control of electric conduction to the armature winding units. The control devices 21 to 24 handle, as an electric conduction target, an armature winding unit that the mover 3 faces, among the armature winding units included in the stators 11 to 14. The control devices 21 to 24 perform computation for electric conduction control based on a speed command for each electric conduction target, and sequentially perform electric conduction to the armature winding units of the electric conduction targets on the basis of the computation result, so as to drive the mover 3.

The control devices 21 to 24 perform electric conduction control in accordance with one or more position commands outputted from the command generating unit 8. Alternatively, the control devices 21 to 24 may perform electric conduction control in accordance with one or more speed commands outputted from the command generating unit 8. The control devices 21 to 24 execute a control loop for the stators 11 to 14 based on the position commands to thereby perform control of electric conduction to the stators 11 to 14.

The mover 3 includes a permanent magnet, and is moved along the guide 9 by a thrust force generated by the stators 11 to 14. The encoder head 4 is mounted on the mover 3. The encoder head 4 outputs light, magnetism, or the like to the reader group 5.

The reader group 5 includes the same number of encoder reading units 51 to 54 as the stators 11 to 14 included in the stator group 1. The reader group 5 herein includes four encoder reading units 51 to 54. The encoder reading units 51 to 54 are arranged at regular intervals to face the encoder head 4. The encoder reading units 51 to 54 are arranged along the guide 9, and the mover 3 on which the encoder head 4 has been mounted moves between the encoder reading units 51 to 54 and the guide 9.

The encoder reading units 51 to 54 each include a transmissive scale, and detect light, magnetism, or the like that has passed through the scale, thereby to detect the position of the encoder head 4. When the area by which the encoder reading units 51 to 54 overlap with the encoder head 4 has become a prescribed amount or larger, the encoder reading units 51 to 54 can detect the position of the encoder head 4. The intervals at which the encoder reading units 51 to 54 are mounted are regular intervals, for example. Note that the intervals at which the encoder reading units 51 to 54 are mounted are not limited to regular intervals, but may be other intervals. In addition, the present embodiment is based on the presumption that a necessary area by which the encoder reading units 51 to 54 overlap with the encoder head 4, for the encoder reading units 51-54 to be able to detect the position is 50% or larger of the area of the encoder head 4. That is, the encoder reading unit that can detect the position in the course of movement of the mover 3 is any one of the encoder reading units 51 to 54.

Upon detecting the position of the encoder head 4, the encoder reading units 51 to 54 transmits position information indicating the detected position to the control devices 21 to 24 and the command generating unit 8 via the position information communication line 6 and the control information communication line 7.

The control information communication line 7 is a communication bus or the like for transmission and reception of information, and is connected with the control devices 21 to 24, the position information communication line 6, and the command generating unit 8. The position information communication line 6 is a communication bus or the like for transmission and reception of information, and is connected with the encoder reading units 51 to 54 and the control information communication line 7.

The command generating unit 8 transmits position commands to the control devices 21 to 24 via the control information communication line 7. The command generating unit 8 also transmits an electric current ratio Mag, which will be described later, to the control devices 21 to 24 via the control information communication line 7. The command generating unit 8 generates position commands on the basis of position information transmitted by the reader group 5 via the position information communication line 6 and the control information communication line 7.

Alternatively, communication between the encoder reading units 51 to 54 and the control devices 21 to 24 may be performed via an information processing device instead of the position information communication line 6 and the control information communication line 7, and information outputted from the encoder reading units 51 to 54 may be directly acquired by the control devices 21 to 24. In addition, communication between the encoder reading units 51 to 54 and the control devices 21 to 24 may be performed via the command generating unit 8.

The command generating unit 8 determines which of the stators 11 to 14 is facing the mover 3 on the basis of the position information of the mover 3, and outputs an electric conduction command to the control device connected with the stator facing the mover 3, the electric conduction command being set to cause the control device to perform electric conduction control. When the control devices 21 to 24 subject the stators 11 to 14 to electric conduction in accordance with their respective electric conduction commands from the command generating unit 8, thrust is generated, so that the mover 3 is driven. In this case, the command generating unit 8 outputs an electric conduction command to a next control device, that is, a posterior side control device immediately before the mover 3 faces a next stator, and thereby a thrust force can be continuously generated between the stators.

When such a process of the electric conduction control is switched, an impact caused by a change in speed of the mover 3, that is, a switching shock may occur. For this reason, the linear motor system 10 of the present embodiment includes digital filters for minimizing mechanical resonance, and performs delay compensation for maintaining continuity of filter output values to reduce the switching shocks. In addition, the linear motor system 10 performs delay compensation on information acquired from an adjacent control device, that is, an anterior side control device to reduce the switching shocks.

The present embodiment is based on the premise that the stator 11 is located on the right, and the stator 12 is located on the left. Specifically, the linear motor system 10 is based on the premise that the stator 11 is disposed at the rightmost end, the stator 12 is disposed at the second position from the right, the stator 13 is disposed at the third position from the right, and the stator 14 is disposed at the leftmost end. In this case, in the linear motor system 10, mover 3 is assumed to move from right to left. Specifically, the mover 3 moves from the stator 11 to the stator 12, from the stator 12 to the stator 13, and from the stator 13 to the stator 14.

Among the stators 11 to 14, a stator located downstream of a first stator in the moving direction of the mover 3 is a second stator. Therefore, when the stator 11 is a first stator, the stator 12 is a second stator. When the stator 12 is a first stator, the stator 13 is a second stator. When the stator 13 is a first stator, the stator 14 is a second stator.

In addition, when the control device 21 is a first control device, the control device 22 is a second control device. When the control device 22 is a first control device, the control device 23 is a second control device. When the control device 23 is a first control device, the control device 24 is a second control device.

When the control device 21 is a first control device and the control device 22 is a second control device, a speed command used by the control device 21 is a first speed command, and a speed command used by the control device 22 is a second speed command. In this case, a position command used by the control device 21 is a first position command, and a position command used by the control device 22 is a second position command.

In the following description, what is described is a case where the control device 21 is a first control device and the control device 22 is a second control device.

Figure 2:
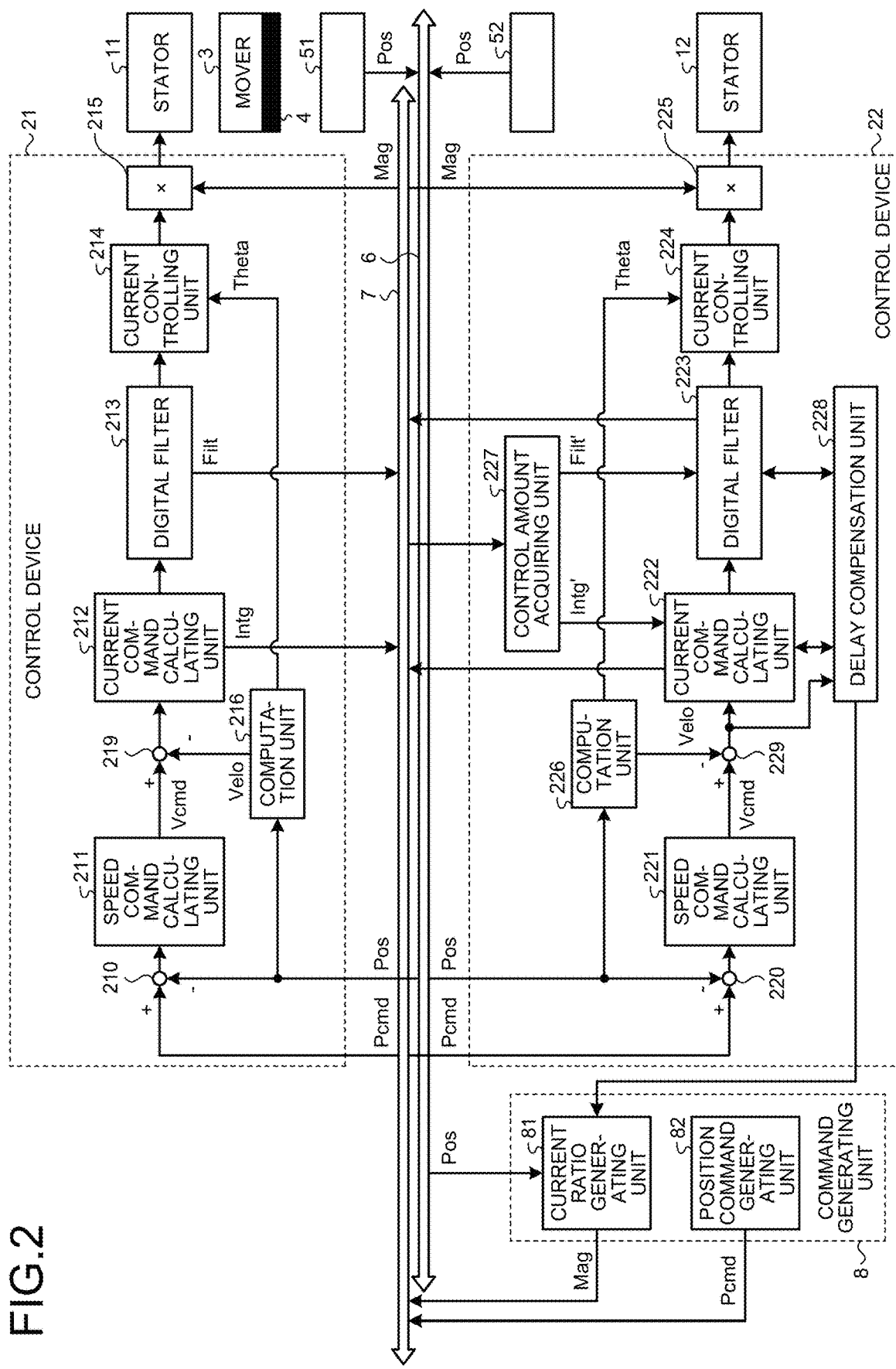
FIG. 2 is a diagram illustrating an example of configurations of control devices included in the linear motor system according to the embodiment.

An example of a specific configuration of the control devices 21 to 24 included in the linear motor system 10 according to the embodiment will now be described. FIG. 2 is a diagram illustrating an example of configurations of the control devices included in the linear motor system according to the embodiment. Note that, because the control devices 21 to 24 have their equal configurations to each other, only configurations of two control devices 21 and 22 adjacent to each other will be described here. In addition, a configuration of the command generating unit 8 will be described.

The control device 21 includes a speed command calculating unit 211, a current command calculating unit 212, a digital filter 213 such as a low-pass filter, a current controlling unit 214, a computation unit 216, subtracting units 210 and 219, and a multiplying unit 215. Likewise, the control device 22 includes a speed command calculating unit 221, a current command calculating unit 222, a digital filter 223, a current controlling unit 224, a computation unit 226, subtracting units 220 and 229, and a multiplying unit 225. The current command calculating unit 212 is a first current command calculating unit, and the current command calculating unit 222 is a second current command calculating unit.

In addition, the control devices 21 and 22 each include a control amount acquiring unit 227 and a delay compensation unit 228. Note that, in FIG. 2, the control amount acquiring unit 227 and the delay compensation unit 228 of the control device 21 are omitted in illustration. The command generating unit 8 includes a current ratio generating unit 81 and a position command generating unit 82.

Because the connections of the components included in the control device 21 are equal to the connections of the components included in the control device 22, only the connections of the components included in the control device 22 will be described. The subtracting unit 220 is connected with the position information communication line 6, the control information communication line 7, and the speed command calculating unit 221, and the speed command calculating unit 221 and the computation unit 226 are connected with the subtracting unit 229. In addition, the computation unit 226 is connected with the position information communication line 6 and the current controlling unit 224. The subtracting unit 229 is connected with the current command calculating unit 222, and the current command calculating unit 222 is connected with the digital filter 223 and the control information communication line 7. The digital filter 223 is connected with the current controlling unit 224 and the control information communication line 7. The current controlling unit 224 is connected with the multiplying unit 225, and the multiplying unit 225 is connected with the stator 12 and the control information communication line 7.

In addition, the control amount acquiring unit 227 is connected with the current command calculating unit 222, the digital filter 223, and the control information communication line 7. The delay compensation unit 228 is connected with the current ratio generating unit 81, the current command calculating unit 222, and the digital filter 223. The current ratio generating unit 81 is connected with the position information communication line 6 and the control information communication line 7, and the position command generating unit 82 is connected with the control information communication line 7.

The current ratio generating unit 81 receives the position information of the encoder head 4 transmitted by the encoder reading units 51 and 52 via the position information communication line 6. The current ratio generating unit 81 also generates, on the basis of the position information, a current ratio Mag indicating a ratio of an electric current used in electric conduction control for switching the control device on electric conduction control is performed. The current ratio Mag is a ratio of an electric current value when a process of the electric conduction control is switched, to a normal current value. The current ratio generating unit 81 generates a current ratio Mag for the control device 21 and a current ratio Mag for the control device 22 when the control device on which electric conduction control is performed is to be switched from the control device 21 to the control device 22. The current ratio generating unit 81 transmits the current ratio Mag to the multiplying units 215 and 225 via the control information communication line 7.

The position command generating unit 82 generates a position command Pcmd specifying a position of the mover 3. The position command generating unit 82 transmits the position command Pcmd to the subtracting units 210 and 220 via the control information communication line 7.

The subtracting unit 220 of the control device 21 calculates a position difference value that is a difference value between a position command Pcmd that is a command input value and a current position Pos. The position command Pcmd is a command indicating a desired position for the mover 3, and the current position Pos is an actual position of the mover 3. The current position Pos is detected by the encoder reading units 51 and 52.

The speed command calculating unit 211 calculates a speed command value Vcmd from the position difference value. The speed command value Vcmd is a command indicating a desired speed for the mover 3. The speed command calculating unit 211 calculates a speed command value Vcmd such that the position difference value becomes 0, that is, such that the position command Pcmd and the current position Pos become equal to each other. The speed command value Vcmd is a command for controlling the mover 3 to be located at a position at which a difference between the position command Pcmd and the current position Pos is eliminated. In this manner, the speed command calculating unit 211 calculates the speed command value Vcmd on the basis of the position difference value. The speed command calculating unit 211 outputs the speed command value Vcmd to the subtracting unit 219.

The computation unit 216 calculates a current speed Velo by performing speed computation using the current position Pos as an input value. The current speed Velo is an actual speed of the mover 3. The computation unit 216 converts the current position Pos to a speed in difference computation or the like, and calculates the current speed Velo that is the speed of the mover 3. The computation unit 216 outputs the current speed Velo to the subtracting unit 219.

In addition, the computation unit 216 calculates a current magnetic pole Theta by performing magnetic pole computation using the current position Pos as an input value. The current magnetic pole Theta is an actual magnetic pole of the mover 3. The current magnetic pole Theta is a magnetic pole for performing magnetic pole control. The computation unit 216 calculates the current magnetic pole Theta indicating a position of a magnetic pole with respect to a reference position, the reference position being a position where the position of the north pole of the permanent magnet of the mover 3 is opposed to the center position of an armature winding of the stator 11, on the basis of the current position Pos.

The subtracting unit 219 calculates a speed deviation (speed difference Vdif described later) that is a difference value between the speed command value Vcmd and the current speed Velo, and inputs the speed deviation to the current command calculating unit 212. The current command calculating unit 212 calculates a current command value from this speed difference Vdif. The current command calculating unit 212 calculates a current command value such that the speed difference Vdif becomes 0, that is, such that the speed command value Vcmd and the current speed Velo become equal to each other. The current command value is a command for controlling the speed of the mover 3 to be a speed at which the difference between the speed command value Vcmd and the current speed Velo is eliminated. As just described, the current command calculating unit 212 calculates the current command value on the basis of the speed difference Vdif.

The current command value calculated by the control device 21 is a first current command value, and the current command value calculated by the control device 22 is a second current command value. The current command calculating unit 212 outputs the calculated current command value to the digital filter 213.

The digital filter 213 performs digital filter computation on the current command value that is an output value from the current command calculating unit 212, and outputs the compensation result to the current controlling unit 214. The current controlling unit 214 calculates a current command value in which a magnetic pole has been adjusted, on the basis of the output value from the digital filter 213 and the current magnetic pole Theta of the computation unit 216. The current controlling unit 214 outputs the calculated current command value to the multiplying unit 215.

The multiplying unit 215 multiplies the current ratio Mag transmitted from the current ratio generating unit 81 by the current command value calculated by the current controlling unit 214, and makes electric conduction in the stator 11 with a current value that is the multiplication result. Note that, because these processes performed by the control device 21 are the same as in the control device 22, explanation thereof will not be repeated.

The control on the mover 3 described above is directed to a case where the number of stators making electric conduction in the mover 3 is one. In a case where the mover 3 overlap with two stators, that is, in a case where the number of stators making electric conduction in the mover 3 is two, the linear motor system 10 needs to perform the computation and electric conduction described above on the two stators. For example, in a situation where the mover 3 faces both of the stator 11 and the stator 12, both of the control device 21 and the control device 22 perform their respective computations and electric conductions.

In the linear motor system 10, the electric conduction process makes such transitions as electric conduction performed only by the control device 21, electric conduction performed by both of the control device 21 and the control device 22, and electric conduction performed only by the control device 22. Alternatively, the linear motor system 10 may make a switch to the electric conduction with only the control device 22 after the electric conduction with only the control device 21 without performing the electric conduction with both of the control device 21 and the control device 22.

Meanwhile, in a case where the linear motor system 10 includes two or more movers 3, the number of movers 3 for which the control devices 21 to 24 can perform computation is limited depending on the processor abilities, memory capacities, and the like of the control devices 21 to 24 included in a system environment of the linear motor system 10. For this reason, the control devices 21 to 24 need to take into consideration the conditions of the movers 3 before performing their computations. The control devices 21 to 24 are, therefore, configured to start computation from a particular time point before the start of electric conduction, without constantly performing the computation.

For example, when the control device 22 switches from a state of not making electric condition to a state of making electric condition, the electric current amount yielded by the control device 22 needs to be continuous with the electric current amount having been yielded until just before the switch in the electric conduction performed by the control device 21. Despite this necessity, if the electric current amounts depart from certain continuity, some switching shock or the like of the mover 3 occurs. So, in the present embodiment, in order to maintain the continuity of electric current amounts, the control amount acquiring unit 227 of the control device 22 acquires internal control amounts depending on computation performed before the electric conduction is started, from the control device 21 before the control device 22 switches to the state of electric conduction. The control amount acquiring unit 227 sets the acquired internal control amounts in the control device 22.

Specifically, the current command calculating unit 212 of the control device 21 calculates a speed integrated value Intg that is one of the internal control amounts, and transmits the calculated speed integrated value Intg to the control amount acquiring unit 227 of the control device 22 via the control information communication line 7. The current command calculating unit 212 calculates the speed integrated value Intg by adding speed deviations that are difference values each between the speed command value Vcmd and the current speed Velo.

In addition, the digital filter 213 of the control device 21 performs digital filter computation with use of a filter control amount Filt that is one of the internal control amounts. The digital filter 213 transmits the filter control amount Filt to the control amount acquiring unit 227 of the control device 22 via the control information communication line 7. The filter control amount Filt is an internal value of the digital filter 213 used in the digital filter computation.

The control amount acquiring unit 227 of the control device 22 acquires the speed integrated value Intg and the filter control amount Filt from the control device 21, and sets the speed integrated value Intg and the filter control amount Filt for the control device 22 itself. In this case, there may be a communication delay in a communication process using the control information communication line 7. In this case, the internal control amount transmitted by the control device 21 becomes an internal control amount containing a delay time corresponding to the communication delay when the internal control amount has reached the control device 22. If the control device 22 uses this internal control amount as is, the speed integrated value Intg and the filter control amount Filt in the control device 21 acquired by the control amount acquiring unit 227 are handled as a speed integrated value Intg' and a filter control amount Filt' each containing a delay time in the control device 22. In this manner, the latest speed integrated value used in the control device 21 is the speed integrated value Intg, whereas the speed integrated value acquired by the control device 22 is the speed integrated value Intg' containing the delay.

In this situation, in the linear motor system 10, the continuity of the current amount is made poor depending on the delay time, thereby leading to poorer controllability. In addition, the digital filter 223 of the control device 22 may be unable to produce an intended vibration suppressing effect owing to some significant discontinuity of the filter control amounts. In the circumstances, the present embodiment has the delay compensation unit 228 for compensating for delay time in communication, which is provided in each of the control devices 21 to 24.

The delay compensation unit 228 compensates for the delay time to calculate a speed integrated value (a speed integrated value Intg" described later) having no delay time from the speed integrated value Intg'. The delay compensation unit 228 acquires the speed difference Vdif that is a speed difference value between the speed command value Vcmd and the current speed Velo, from the subtracting unit 229, and transmits the speed integrated value Intg" calculated using the speed difference Vdif to the current command calculating unit 222.

In addition, the delay compensation unit 228 transmits the number of digital filter computations that is the number of digital filter computations, to the digital filter 223. The number of digital filter computations is a number associated with the delay time in communication. In addition, the delay compensation unit 228 receives, from the digital filter 223, a notification indicating that an output value with no delay time has been obtained.

In the linear motor system 10, the control device 22 transmits a speed integrated value Intg and a filter control amount Filt of the control device 22 to the control device 23 by a process similar to that performed by the control device 21. In addition, the control device 23 controls the mover 3 by a process similar to that performed by the control device 22.

Similarly, in the linear motor system 10, the control device 23 transmits a speed integrated value Intg and a filter control amount Filt of the control device 23 to the control device 24 by a process similar to that performed by the control device 21. In addition, the control device 24 controls the mover 3 by a process similar to that performed by the control device 22.

Figure 3:
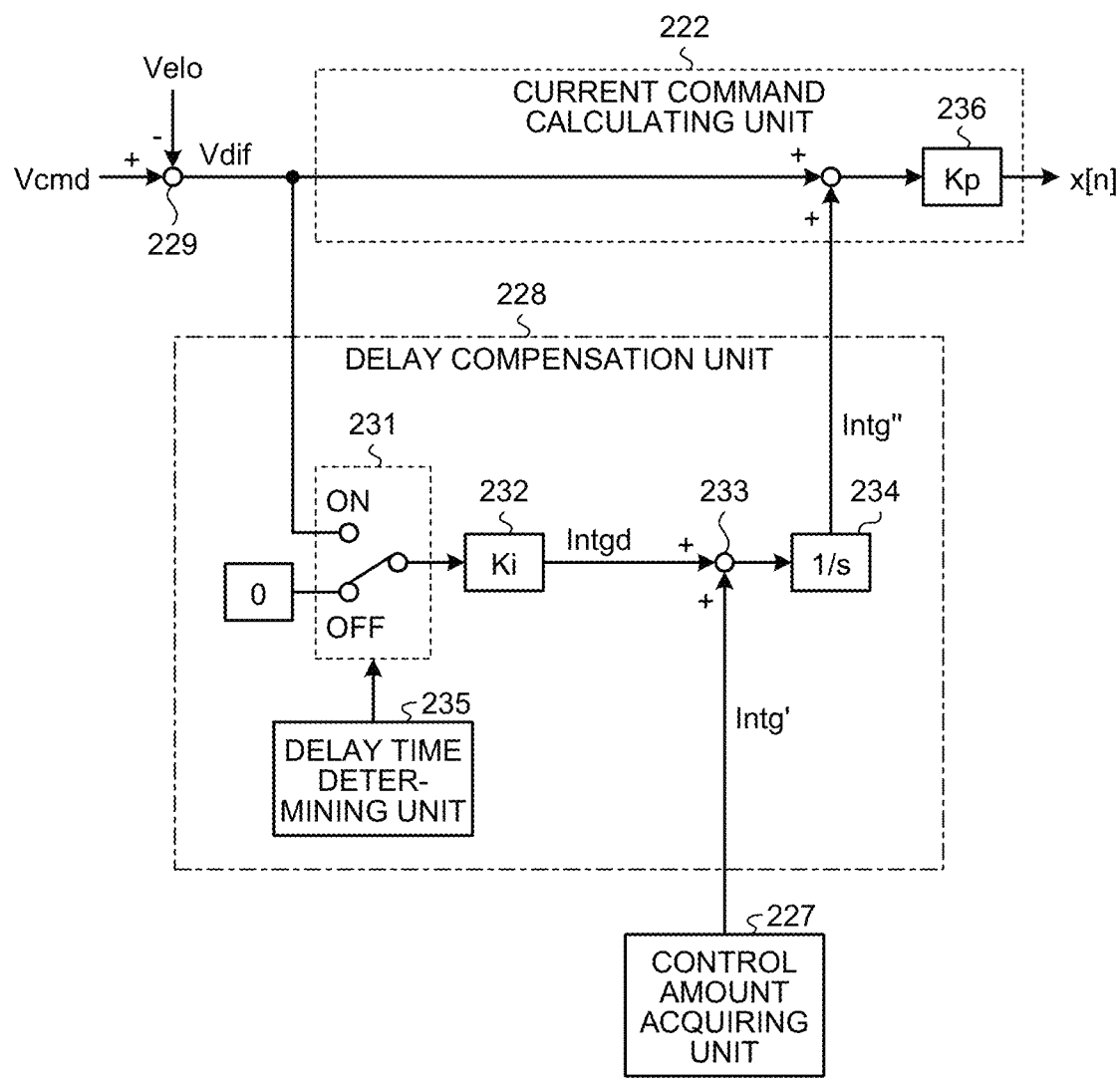
FIG. 3 is a diagram illustrating an example of a configuration of a delay compensation unit included in a control device according to the embodiment.

A configuration of the delay compensation unit 228 will now be described. FIG. 3 is a diagram illustrating an example of a configuration of a delay compensation unit included in a control device according to the embodiment. Because the delay compensation units 228 included in the control devices 21 to 24 have configurations similar to each other, only a configuration of the delay compensation unit 228 of the control device 22 will be described herein. Although the delay compensation unit 228 is connected with the current command calculating unit 222 and the digital filter 223, the connection with the digital filter 223 is omitted in illustration in FIG. 3.

In the following description, it is assumed that the same position command Pcmd and the same current position Pos have been inputted to the control device 21 and the control device 22 from a well prior phase.

The subtracting units 229 calculates a difference value between the speed command value Vcmd and the current speed Velo as a speed difference Vdif, and outputs the speed difference Vdif to the current command calculating unit 222 and the delay compensation unit 228. The delay compensation unit 228 includes a delay time determining unit 235, a switch 231, a multiplying unit 232, an adding unit 233, and an integrating unit 234.

The delay time determining unit 235 determines whether or not an integrating process can be performed using the speed difference Vdif on the basis of a delay time in order to eliminate a delay in the speed integrated value Intg' from the control device 21 to the control device 22. For example, the delay time determining unit 235 outputs an off command to the switch 231 at a timing further before a timing that is the delay time before a timing at which the control device 22 receives the speed integrated value Intg'.

As described above, the delay time determining unit 235 determines a delay time in communication between the control devices 21 and 22, and controls the switch 231 on the basis of the delay time. The delay time determining unit 235 outputs an on command or an off command to the switch 231 in accordance with an on or off instruction transmitted by the command generating unit 8 via the control information communication line 7, for example. Specifically, the delay time determining unit 235 determines whether the delay time in communication between the control devices 21 and 22 is the time for outputting an on command to the switch 231 or the time for outputting an off command to the switch 231, on the basis of an on or off instruction transmitted from the command generating unit 8.

The delay time determining unit 235 outputs an on command to the switch 231 upon receiving an on instruction from the command generating unit 8, and outputs an off command to the switch 231 upon receiving an off instruction from the command generating unit 8. The switch 231 switches an output to the multiplying unit 232 to "0" or a speed difference Vdif in accordance with a command from the delay time determining unit 235.

For example, upon receiving an off command from the delay time determining unit 235, the switch 231 switches its output to "0". As a result, "0" is outputted from the switch 231 to the multiplying unit 232, and accordingly the integration process is not performed on the speed difference Vdif.

Thereafter, the delay time determining unit 235 outputs an on command to the switch 231 at a timing that matches the delay time or shorter. In response to this output, the switch 231 switches its output to the speed difference Vdif. As a result, the speed difference Vdif is outputted from the switch 231. This speed difference Vdif is sent to the multiplying unit 232. The multiplying unit 232 calculates a multiplication result value Intgd by multiplying the speed difference Vdif by an integration gain Ki, and outputs the multiplication result value Intgd to the adding unit 233. The adding unit 233 sends the speed integrated value Intg' and the multiplication result value Intgd to the integrating unit 234.

The integrating unit 234 performs an integration process using the multiplication result value Intgd by cumulatively adding the multiplication result value Intgd to the speed integrated value Intg' in a sequential order. In this manner, the delay compensation unit 228 adds the speed integrated value Intg' that is an integrated quantity containing the delay time, to a sum of multiplication result values Intgd that are integrated quantities to be cumulatively added during the delay time, and as a result thereof the unit 228 can calculate the speed integrated value Intg" that does not contain the delay time. Note that the integrating unit 234 makes addition of the speed integrated value Intg' only once, and does not add the speed integrated value Intg' after the speed integrated value Intg' has been added until a speed integrated value Intg' is set again. The speed integrated value Intg is a first speed integrated value, and the speed integrated value Intg" is a second speed integrated value.

As described above, because the speed integrated value Intg' acquired from the control device 21 by the control amount acquiring unit 227 contains the delay component, if the speed integrated value Intg' without any change is added to the speed difference Vdif, the speed integrated value obtained by the addition contains a delay.

In the present embodiment, the delay compensation unit 228 adds, to the speed difference Vdif, the speed integrated value Intg" that does not contain any delay time that has been obtained by adding a sum of the multiplication result values Intgd to be added up during the delay time to the speed integrated value Intg' containing the delay time.

The delay compensation unit 228 calculates the speed integrated value Intg" with use of a ring buffer, for example. In this case, the delay compensation unit 228 uses a ring buffer capable of storing all the speed differences Vdif associated with the delay time. The delay compensation unit 228 uses a ring buffer in which a speed difference Vdif that is older than the delay time is overwritten with a speed difference Vdif within the delay time, for example. In this manner, the delay compensation unit 228 constantly stores a maximum allowable number of speed differences Vdif that can be stored in the ring buffer, that is, speed differences Vdif within a time length corresponding to the delay time.

By so doing, in the ring buffer, while speed differences Vdif for the delay time are constantly stored, speed differences Vdif older than the delay time are deleted. The delay compensation unit 228 calculates the speed integrated value Intg" by adding all the speed differences Vdif for the delay time having been cumulatively added in the ring buffer to the speed integrated value Intg' at the time when the unit 228 receives the speed integrated value Intg'.

The current command calculating unit 222 adds the speed integrated value Intg" that is a speed integrated value calculated by the delay compensation unit 228, to the speed difference Vdif, multiplies the result of addition by the speed proportional gain Kp by the multiplying unit 236, and outputs the result of multiplication as an output value, that is, an input value x[n] for the digital filter 223. The speed proportional gain Kp is a gain for adjusting a following capability of a speed loop. The input value x[n] is a current command, and is sent to the digital filter 223.

Figure 4:
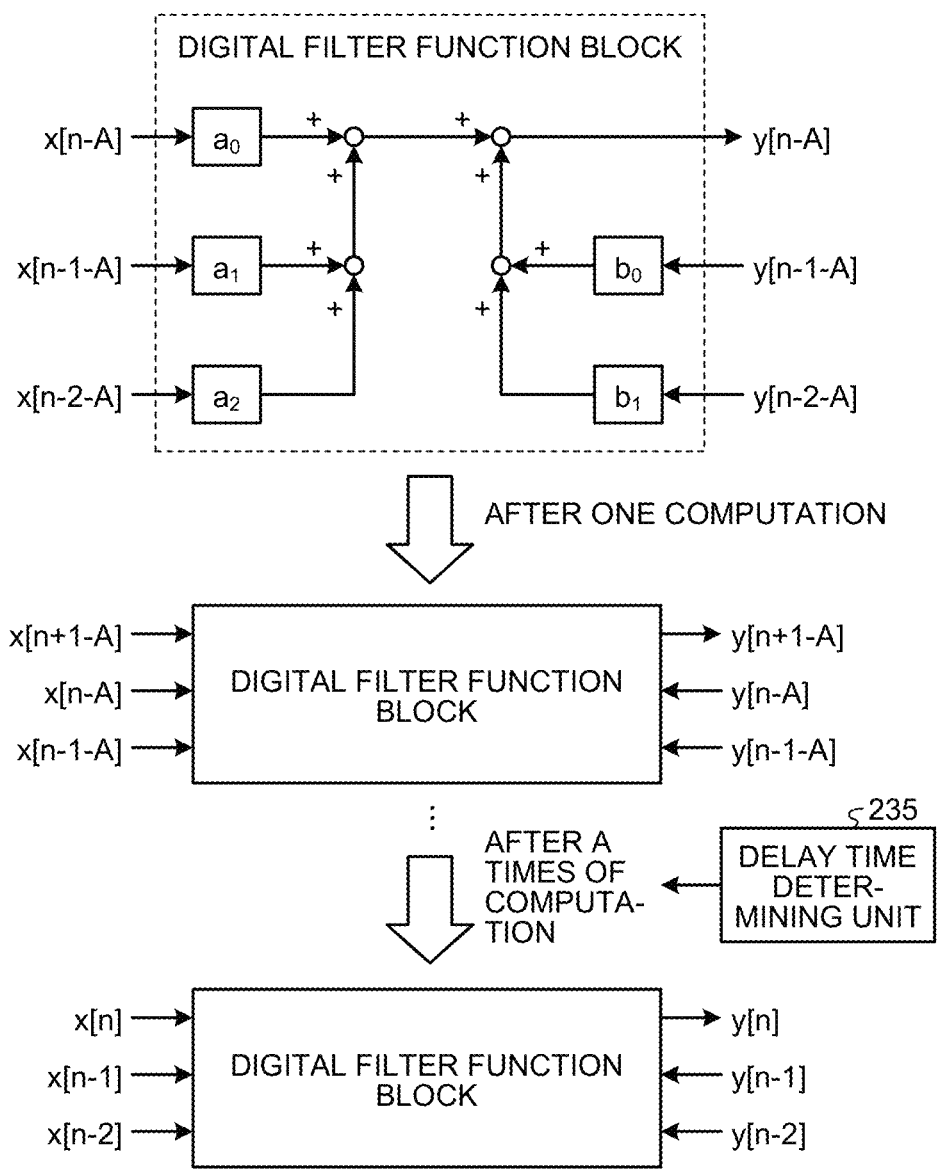
FIG. 4 is a diagram for explaining a delay compensation process performed by a digital filter and a delay compensation unit of a control device according to the embodiment.

Next, specific processing performed by the delay compensation unit 228 for the digital filter 223 will be explained. FIG. 4 is a diagram for explaining a delay compensation process performed by the digital filter and the delay compensation unit of a control device according to the embodiment. In this part, description is given for a case where an example of the digital filter 223 is a primary infinite impulse response (IIR) notch filter.

The digital filter 223 adds a value obtained by multiplying a current input value x[n] that is an input value for this time by a filter coefficient $a_0$, a value obtained by multiplying a previous input value x[n−1] that is an input value for the last time by a filter coefficient $a_1$, and a value obtained by multiplying a before-the-last input value x[n−2] that is an input value for the last but one by a filter coefficient $a_2$. The digital filter 223 outputs a digital filter output value as a current output value y[n], the digital filter output value being obtained by adding, to the addition result value obtained as described above, a value obtained by multiplying a previous output value y[n−1] that is an output value for the last time by a filter coefficient $b_0$, and a value obtained by multiplying a before-the-last output value y[n−2] that is an output value for the last but one by a filter coefficient bi.

As seen from the above, values for two computations before a computation starting point are needed to construct the digital filter 223. More specifically, the previous input value x[n−1], the before-the-last input value x[n−2], the previous output value y[n−1], and the before-the-last output value y[n−2] are needed. The control device 22 can acquire these four values for the control device 21 by the control amount acquiring unit 227. In the present embodiment, the four values are collectively expressed as filter control amounts Filt, and filter control amounts containing a delay time are expressed as filter control amounts Filt'.

Note that the filter control amounts Filt may be set to include or not to include the current input value x[n]. When the current input value x[n] is not included in the filter control amounts Filt, the delay compensation unit 228 of the control device 22 calculates the current input value x[n] with use of a speed difference Vdif. Alternatively, the digital filter 223 may calculate the current input value x[n] with use of a speed difference Vdif. A method for calculating the current input value x[n] will be described later.

The digital filter 223 performs a plurality of times of digital filter computations by repeating the digital filter computation the number of digital filter computation times specified by the delay compensation unit 228. In FIG. 4, a digital filter computation process for one time is illustrated as a digital filter function block. That is, the number of digital filter function blocks corresponds to the number of digital filter computations.

When the number of digital filter computations proportionate to the delay time in the control amount obtaining unit 227 is represented by A, the internal values of the digital filter 223 at a time point that is a delay time before a time point at which the filter control amount Filt' has been acquired are a current input value x[n−A], a previous input value x[n−1−A], a before-the-last input value x[n−2−A], a current output value y[n−A], a previous output value y[n−1−A], and a before-the-last output value y[n−2−A]. A method of restoring the internal values of the digital filter 223 before A times of computations to values worth of the current values will be explained.

First, the delay time determining unit 235 acquires a value of the number A of digital filter computations proportionate to the delay time. An example of this acquiring manner is a method using information acquired from the command generating unit 8 via the control information communication line 7 by the delay time determining unit 235. In this case, the command generating unit 8 calculates the value of the number A of digital filter computations on the basis of a relation between a computation process period of a digital filter computation and a delay time in communication. For example, in a case where the computation process period of digital filter computations is 50 μs and the delay time in communication is 200 μs, four digital filter computations are performed during the communication delay. Therefore, the command generating unit 8 in this case notifies the delay time determining unit 235 of four as the number A of digital filter computations.

Alternatively, the value of the number A of digital filter computations may be acquired in a method of setting a parameter therefor in the control device 22 in advance, a method of directly setting it by means of software programming, or some method like that.

The control device 22 can obtain the value of the current output value y[n−A] by carrying out the digital filter computation performed by the digital filter 223 once.

Subsequently, the internal values of the digital filter 223 at a time point when the control device 22 carries out computation performed by the digital filter 223 one more time are a current input value x[n+1−A], a previous input value x[n−A], a before-the-last input value x[n−1−A], a current output value y[n+1−A], a previous output value y[n−A], and a before-the-last output value y[n−1−A].

The delay compensation unit 228 of the control device 22 calculates the current input value x[n+1−A] with use of a ring buffer, for example. In this case, the delay compensation unit 228 uses a ring buffer in which all the speed differences Vdif for A computations can be stored. The delay compensation unit 228 uses a ring buffer in which speed differences Vdif that are older than the A computations are overwritten with speed differences Vdif of the most recent A computations, for example. The delay compensation unit 228 reads the current speed difference Vdif from the ring buffer. The current command calculating unit 222 calculates the current input value x[n+1−A] by adding the current speed difference Vdif to the previous speed integrated value Intg" and multiplying the addition result by the speed proportional gain Kp In addition, for the previous input value x[n−A], the before-the-last input value x[n−1−A], the previous output value y[n−A], and the before-the-last output value y[n−1−A], the values used in the last digital filter computation may be used again. In this manner, the control device 22 can obtain the value of the current output value y[n+1−A].

The control device 22 can obtain the current output value y[n] that is a digital filter output value with no delay time, by repeating the digital filter computation A times in such a way. The digital filter 223 notifies the delay compensation unit 228 that a digital filter output value without a delay time has been obtained. In response to this notification, the delay compensation unit 228 notifies the current ratio generating unit 81 that the digital filter output value with no delay time has been obtained. Because the current ratio generating unit 81 can start electric conduction in a state in which the continuity of the amounts of current are maintained, by means of appropriately controlling the current ratio Mag, shocks on the mover 3 can be reduced. Specifically, the current ratio generating unit 81 sets the current ratio Mag for the control device 22 to "0" before a digital filter output value with no delay time is obtained, but sets the current ratio Mag for the control device 22 to "a value other than 0" to start electric conduction when a digital filter output value with no delay time has been obtained.

Control amount transmission such as processes of transmitting the speed integrated values Intg and the filter control amounts Filt described above and delay time compensation can be applied not only to the digital filter 223 but also to other control functions of a feed forward controller or the like. A feed forward controller is included in at least one of the speed command calculating unit 211, the current command calculating unit 212, and the current controlling unit 214. In other words, at least one of the speed command calculating unit 211, the current command calculating unit 212, and the current controlling unit 214 performs feed forward control with use of feed forward controller control amounts when the mover 3 is driven.

In this case as well, the control amount acquiring unit 227 of the control device 22 acquires the feed forward controller control amount from the control device 21. By applying control amount transmission such as processing of transmitting feed forward controller control amounts and delay time compensation to the feed forward controller, the control device 22 can acquire a feed forward correction value with no delay, similarly. As a result, the control device 22 can achieve speed-up on a positioning required time based on the feed forward corrected value, and further reduction in vibration by a vibration suppressing function using a feed forward controller. The feed forward control performed by the control device 21 is first feed forward control, and the feed forward control performed by the control device 22 is second feed forward control.

As described above, in the linear motor system 10, the control device 22 receives, from the control device 21, a speed integrated value Intg for generating a current command associated with a speed command, and generates a current command by using the speed integrated value Intg, thereby making it possible to reduce the switching shocks.

In addition, in the linear motor system 10, the control device 22 receives, from the control device 21, the filter control amount Filt used by the digital filter 213 of the control device 21, and performs digital filter computation with use of the filter control amount Filt'. As a result, the linear motor system 10 can minimize resonant vibration and switching shocks specific to the components of the linear motor system 10. The linear motor system 10 can therefore further reduce vibration and improve the basic performance thereof.

The digital filter 213 of the control device 21 is a first digital filter, and the digital filter 223 of the control device 22 is a second digital filter. In this case, digital filter computation performed by the digital filter 213 of the control device 21 is first digital filter computation, and digital filter computation performed by the digital filter 223 of the control device 22 is second digital filter computation.

In addition, in the linear motor system 10, the control device 22 performs delay compensation on the speed integrated value Intg' and the filter control amount Filt' and thereafter uses the speed integrated value Intg' and the filter control amount Filt', thereby making it possible to reduce switching shocks associated with the delay.

The control device 22 may perform delay compensation on the speed integrated value Intg' and the feed forward controller control amounts, and then use the speed integrated value Intg' and the feed forward controller control amounts to drive the mover 3. This enables reduction in switching shocks caused by the delay.

Note that the control devices 21 to 24 may not include the delay compensation unit 228. For example, in the case of the control device 22, a speed integrated value Intg' sent from the control amount acquiring unit 227 is sent as is to the current command calculating unit 222 without any change. Even in this case, because the control device 22 performs the digital filter computation with use of the speed integrated value Intg' and the filter control amount Filt', resonant vibration and switching shocks specific to the components of the linear motor system 10 can be minimized.

Figure 5:
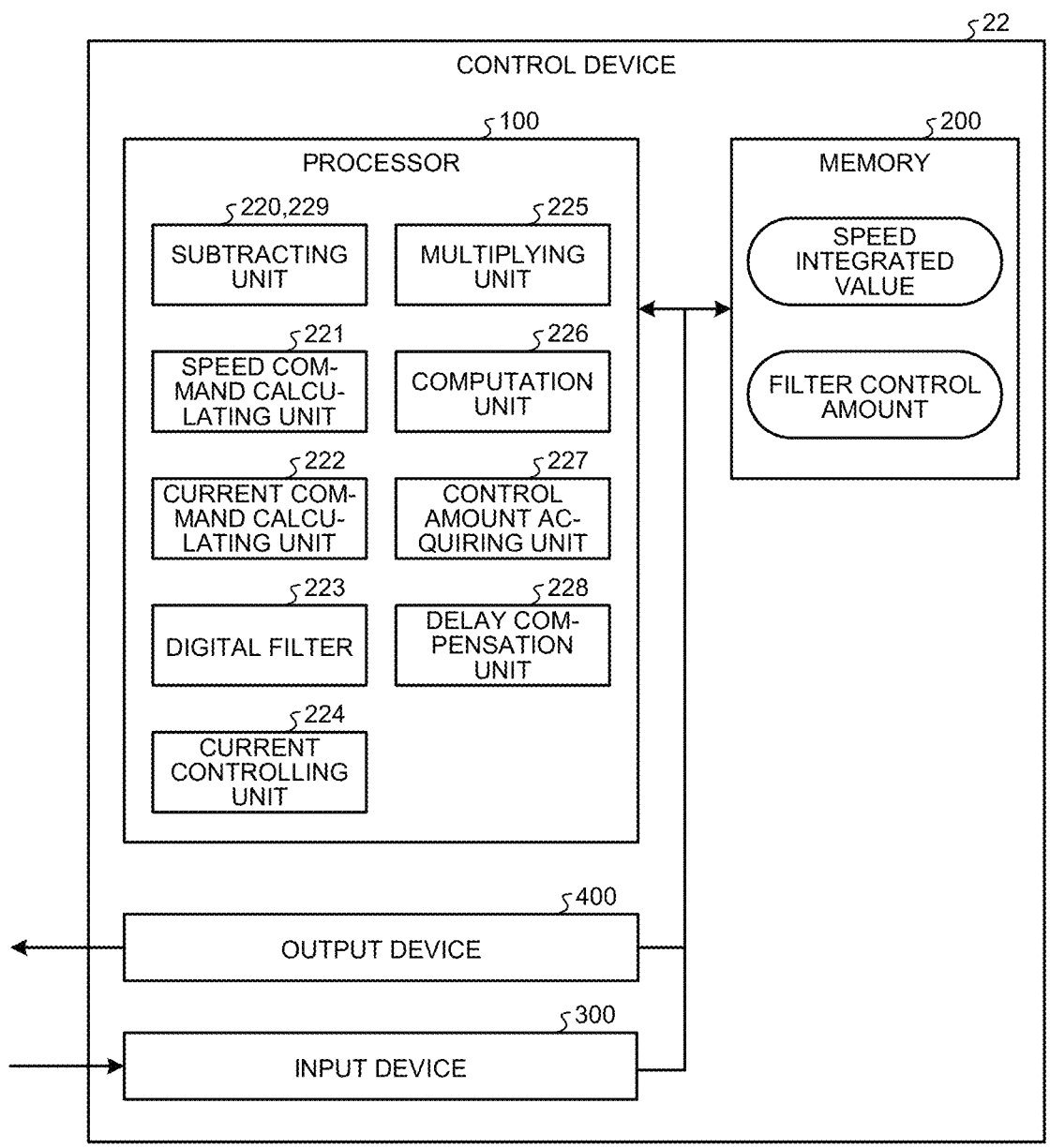
FIG. 5 is a diagram illustrating an example of a hardware configuration that implements the control device according to the embodiment.

A hardware configuration for the control devices 21 to 24 will now be described. FIG. 5 is a diagram illustrating an example of a hardware configuration implementing a control device according to the embodiment. Note that, because the control devices 21 to 24 have their respective equal hardware configurations, the hardware configuration of the control device 22 will be described herein.

The control device 22 can be implemented by a processor 100, a memory 200, an input device 300, and an output device 400. Examples of the processor 100 include a central processing unit (CPU; also referred to as a central processing device, a processing device, a computing device, a microprocessor, a microcomputer, or a digital signal processor (DSP)) or a system large scale integration (LSI) circuit. Examples of the memory 200 include a random access memory (RAM) and a read only memory (ROM).

The control device 22 is implemented by the processor 100 reading and executing a computer-executable control program for performing the operations of the control device 22, stored in the memory 200. In other words, the control program that is a program for performing the operations of the control device 22 is configured to cause a computer to execute the procedures or the methods for the control device 22.

The control program to be executed by the control device 22 has a modular composition including the subtracting units 220 and 229, the speed command calculating unit 221, the current command calculating unit 222, the digital filter 223, the current controlling unit 224, the multiplying unit 225, the computation unit 226, the control amount acquiring unit 227, and the delay compensation unit 228, wherein these units are loaded into a main storage device and produced in the main storage device.

The input device 300 receives a position command Pcmd, a current position Pos, an electric current ratio Mag, a speed integrated value Intg, and a filter control amount Filt, and transmits them to the processor 100. The memory 200 is used for a temporary memory when the processor 100 performs various kinds of processes. The memory 200 stores therein the speed integrated values Intg, Intg', and Intg", and the filter control amounts Filt and Filt', and so on. The output device 400 outputs the speed integrated value Intg, the filter control amount Filt and the like to the control device 23.

The control programs may be stored in a computer readable storage medium in a form of a file or files that can be installed or executed, and provided as a computer program product. Alternatively, the control program may be provided to the control device 22 via a network such as the Internet. Note that some of the functions of the control device 22 may be implemented by dedicated hardware such as a dedicated circuitry, and the others thereof may be implemented by software or firmware.

As described above, in the embodiment, the speed integrated values Intg' and the filter control amounts Filt' are transferred between the control devices 21 and 22. The control device 22 then calculates a speed integrated value Intg" on the basis of the speed integrated value Intg' used by the control device 21, and performs digital filter computation with use of internal values of the digital filter computation used by the control device 21. Switching shocks caused when electric conduction to the mover 3 is switched can therefore be sufficiently reduced.

In addition, the speed integrated values Intg' and the feed forward controller control amounts are transferred between the control devices 21 and 22. The control device 22 then calculates a speed integrated value Intg" on the basis of the speed integrated value Intg' used by the control device 21, and performs feed forward control with use of the feed forward controller control amount used by the control device 21. Switching shocks caused when electric conduction to the mover 3 is switched can therefore be sufficiently reduced.

In addition, because the control device 22 performs delay compensation on the speed integrated value Intg' and the filter control amount Filt', switching shocks caused by the delay can be reduced. Furthermore, because the control device 22 performs delay compensation on the speed integrated value Intg' and the feed forward controller control amount, switching shocks caused by the delay can be reduced.

The configurations presented in the embodiment above are just examples, which can each be combined with other publicly known techniques and partly omitted and/or modified without departing from the scope of the present disclosure.

REFERENCE SIGNS LIST 1 stator group; 2 control device group; 3 mover; 4 encoder head; 5 reader group; 6 position information communication line; 7 control information communication line; 8 command generating unit; 9 guide; 10 linear motor system; 11 to 14 stator; 21 to 24 control device; 51 to 54 encoder reading unit; 81 current ratio generating unit; 82 position command generating unit; 100 processor; 200 memory; 210, 219, 220, 229 subtracting unit; 211, 221 speed command calculating unit; 212, 222 current command calculating unit; 213, 223 digital filter; 214, 224 current controlling unit; 215, 225, 232, 236 multiplying unit; 216, 226 computation unit; 227 control amount acquiring unit; 228 delay compensation unit; 231 switch; 233 adding unit; 234 integrating unit; 235 delay time determining unit; 300 input device; 400 output device.

The invention claimed is:

1. A linear motor system comprising:
a first stator;
a second stator;
a mover disposed to face the first stator and the second stator;

first control circuitry to drive the mover by performing electric conduction to the first stator on the basis of a first speed command or a first position command for the mover when the mover faces the first stator;
second control circuitry to drive the mover by performing electric conduction to the second stator on the basis of a second speed command or a second position command for the mover when the mover faces the second stator; and
command generating circuitry to transmit the first speed command or the first position command to the first control circuitry and transmit the second speed command or the second position command to the second control circuitry when the mover moves from the first stator to the second stator, thereby to sequentially cause the first control circuitry to perform electric conduction to the first stator and the second control circuitry to perform electric conduction to the second stator, wherein
the first control circuitry includes:
first current command calculating circuitry to calculate a first current command value for the first stator on the basis of a first speed integrated value obtained by integrating a speed deviation between the first speed command and a current speed that is an actual speed of the mover; and
a first digital filter to perform first digital filter computation on the first current command value,
the second control circuitry includes:
second current command calculating circuitry to calculate a second current command value for the second stator on the basis of a second speed integrated value obtained by integrating a speed deviation between the second speed command and a current speed that is an actual speed of the mover;
a second digital filter to perform second digital filter computation on the second current command value; and
control amount acquiring circuitry to acquire, from the first control circuitry, the first speed integrated value used by the first current command calculating circuitry and an internal value of the first digital filter when the first digital filter has performed the first digital filter computation,
the second current command calculating circuitry calculates the second speed integrated value on the basis of the first speed integrated value, and
the second digital filter performs the second digital filter computation with use of the internal value.

2. The linear motor system according to claim 1, wherein
the first control circuitry performs first feed forward control when driving the mover,
the second control circuitry performs second feed forward control when driving the mover,
the control amount acquiring circuitry acquires, from the first control circuitry, a feed forward controller control amount used when the first control circuitry has performed the first feed forward control, and
the second feed forward control is performed using the feed forward controller control amount.

3. A linear motor system comprising:
a first stator;
a second stator;
a mover disposed to face the first stator and the second stator;
first control circuitry to drive the mover by performing electric conduction to the first stator on the basis of a first speed command or a first position command for the mover when the mover faces the first stator;
second control circuitry to drive the mover by performing electric conduction to the second stator on the basis of a second speed command or a second position command for the mover when the mover faces the second stator; and
command generating circuitry to transmit the first speed command or the first position command to the first control circuitry and transmit the second speed command or the second position command to the second control circuitry when the mover moves from the first stator to the second stator, thereby to sequentially cause the first control circuitry to perform electric conduction to the first stator and the second control circuitry to perform electric conduction to the second stator, wherein
the first control circuitry performs first feed forward control with use of a feed forward controller control amount when driving the mover,
the first control circuitry includes a first current command calculating circuitry to calculate a first current command value for the first stator on the basis of a first speed integrated value obtained by integrating a speed deviation between the first speed command and a current speed that is an actual speed of the mover,
the second control circuitry performs second feed forward control when driving the mover,
the second control circuitry includes:
second current command calculating circuitry to calculate a second current command value for the second stator on the basis of a second speed integrated value obtained by integrating a speed deviation between the second speed command and a current speed that is an actual speed of the mover; and
control amount acquiring circuitry to acquire, from the first control circuitry, the first speed integrated value used by the first control circuitry and a feed forward controller control amount used by the first control circuitry,
the second current command calculating circuitry calculates the second speed integrated value on the basis of the first speed integrated value, and
the second control circuitry performs the second feed forward control with use of the feed forward controller control amount.

4. The linear motor system according to claim 1, wherein the second control circuitry calculates, from the first speed integrated value, the second speed integrated value obtained by compensating for a delay time of the first speed integrated value from transmission of the first speed integrated value by the first control circuitry until reception of the first speed integrated value by the control amount acquiring circuitry.

5. The linear motor system according to claim 4, wherein the second control circuitry calculates the second speed integrated value by adding the speed deviation during the delay time to the first speed integrated value.

6. The linear motor system according to claim 1, wherein the second control circuitry is connected via a communication bus, and
the control amount acquiring circuitry acquires the first speed integrated value from the first control circuitry via the communication bus.

7. The linear motor system according to claim 1, wherein the control amount acquiring circuitry acquires the first speed integrated value from the first control circuitry via the command generating circuitry.

8. The linear motor system according to claim 3, wherein the second control circuitry calculates, from the first speed integrated value, the second speed integrated value obtained by compensating for a delay time of the first speed integrated value from transmission of the first speed integrated value by the first control circuitry until reception of the first speed integrated value by the control amount acquiring circuitry.

9. The linear motor system according to claim 8, wherein the second control circuitry calculates the second speed integrated value by adding the speed deviation during the delay time to the first speed integrated value.

10. The linear motor system according to claim 3, wherein the second control circuitry is connected via a communication bus, and the control amount acquiring circuitry acquires the first speed integrated value from the first control circuitry via the communication bus.

11. The linear motor system according to claim 3, wherein the control amount acquiring circuitry acquires the first speed integrated value from the first control circuitry via the command generating circuitry.

12. The linear motor system according to claim 3, wherein the first control circuitry includes a first digital filter to perform first digital filter computation on the first current command value, the second control circuitry includes a second digital filter to perform second digital filter computation on the second current command value, the control amount acquiring circuitry acquires, from the first control circuitry, an internal value of the first digital filter when the first digital filter has performed the first digital filter computation, and the second digital filter performs the second digital filter computation with use of the internal value.

13. A linear motor system comprising:

a first stator;

a second stator;

a mover disposed to face the first stator and the second stator;

first control circuitry to drive the mover by performing electric conduction to the first stator on the basis of a first speed command or a first position command for the mover when the mover faces the first stator;

second control circuitry to drive the mover by performing electric conduction to the second stator on the basis of a second speed command or a second position command for the mover when the mover faces the second stator; and command generating circuitry to transmit the first speed command or the first position command to the first control circuitry and transmit the second speed command or the second position command to the second control circuitry when the mover moves from the first stator to the second stator, thereby to sequentially cause the first control circuitry to perform electric conduction to the first stator and the second control circuitry to perform electric conduction to the second stator, wherein the first control circuitry includes:

first current command calculating circuitry to calculate a first current command value for the first stator on the basis of a first speed integrated value obtained by integrating a speed deviation between the first speed command and a current speed that is an actual speed of the mover, the second control circuitry includes:

second current command calculating circuitry to calculate a second current command value for the second stator on the basis of a second speed integrated value obtained by integrating a speed deviation between the second speed command and a current speed that is an actual speed of the mover; and control amount acquiring circuitry to acquire, from the first control circuitry, the first speed integrated value used by the first current command calculating circuitry, and the second current command calculating circuitry calculates the second speed integrated value on the basis of the first speed integrated value.

* * * * *